(12) United States Patent
Shimojo et al.

(10) Patent No.: US 8,650,971 B2
(45) Date of Patent: Feb. 18, 2014

(54) SLIPPAGE DETECTION DEVICE AND METHOD

(75) Inventors: Makoto Shimojo, Ibaraki (JP); Seiichi Teshigawara, Tokyo (JP)

(73) Assignees: The University of Electro-Communications, Choufu-shi (JP); Inaba Rubber Co., Ltd., Osaka-shi (JP)

(*) Notice: Subject to any disclaimer, the term of this patent is extended or adjusted under 35 U.S.C. 154(b) by 217 days.

(21) Appl. No.: 13/321,972

(22) PCT Filed: May 14, 2010

(86) PCT No.: PCT/JP2010/058576
§ 371 (c)(1),
(2), (4) Date: Nov. 22, 2011

(87) PCT Pub. No.: WO2010/134584
PCT Pub. Date: Nov. 25, 2010

(65) Prior Publication Data
US 2012/0067142 A1   Mar. 22, 2012

(30) Foreign Application Priority Data
May 22, 2009 (JP) .................... 2009-124463

(51) Int. Cl.
*G01L 1/22* (2006.01)
(52) U.S. Cl.
USPC ............. 73/862.474; 73/862.381; 901/46
(58) Field of Classification Search
USPC .............. 73/862.381, 862.473, 862.474, 73/862.451, 862.471; 901/33, 46
See application file for complete search history.

(56) References Cited

U.S. PATENT DOCUMENTS

| | | | |
|---|---|---|---|
| 4,273,682 A | 6/1981 | Kanamori | |
| 4,709,342 A | 11/1987 | Hosoda et al. | |
| 5,010,774 A * | 4/1991 | Kikuo et al. | ............. 73/862.046 |
| 6,558,577 B1 | 5/2003 | Niihara et al. | |
| 2008/0066564 A1 | 3/2008 | Hayakawa et al. | |

FOREIGN PATENT DOCUMENTS

| | | |
|---|---|---|
| JP | 4 48597 | 2/1992 |
| JP | 7-7607 B2 | 1/1995 |
| JP | 7 90486 | 4/1995 |
| JP | 2000 299016 | 10/2000 |

(Continued)

OTHER PUBLICATIONS

Translation of the International Preliminary Report on Patentability issued Dec. 15, 2011, in PCT Application No. PCT/JP2010/058576.

(Continued)

*Primary Examiner* — Lisa Caputo
*Assistant Examiner* — Roger Hernandez-Prewitt
(74) *Attorney, Agent, or Firm* — Oblon, Spivak, McClelland, Maier & Neustadt, L.L.P.

(57) ABSTRACT

A simply-structured initial slippage detection mechanism. When a contact member comes in contact with a contact receiving member via a pressure-sensitive conductive sheet, it is confirmed, on the basis of a change in resistivity of the pressure-sensitive conductive sheet and in response to a detection signal transmitted from the pressure-sensitive conductive sheet, that initial slippage has occurred right before the occurrence of slippage displacement, at a time when a high-frequency waveform component generated right before the occurrence of the slippage displacement of the contact member exceeds a predetermined threshold value. Therefore, it is possible to realize a slippage detection device whose slippage detection section is smaller, more lightweight and thinner.

4 Claims, 15 Drawing Sheets

(56) References Cited

FOREIGN PATENT DOCUMENTS

| JP | 2004 226380 | 8/2004 |
|---|---|---|
| JP | 2008-70327 | 3/2008 |
| JP | 2008 128940 | 6/2008 |
| JP | 2008 250978 | 10/2008 |
| JP | 2009 034744 | 2/2009 |
| WO | WO 2007069412 A1 * | 6/2007 ................ G01L 1/20 |

OTHER PUBLICATIONS

International Search Report Issued Jul. 20, 2010 in PCT/JP10/058576 Filed May 14, 2010.

* cited by examiner (A)

(B)

SLIPPAGE DETECTION DEVICE AND METHOD

TECHNICAL FIELD

The present invention relates to a slippage detection device and method, and particularly to a process of ensuring that a slippage start action of a stationary object, which is in contact with a slippage detection surface, is detected.

BACKGROUND ART

Conventionally, what is proposed is a tactile sensor that uses a pressure-sensitive conductive sensor to detect the distribution of compression-direction pressure applied from an object that is in contact with a slippage detection surface, thereby recognizing the feeling of the motion of the object that is in contact with the slippage detection surface (See Patent Document 1).

Moreover, the pressure-sensitive conductive sensor proposed is designed to detect, as a change in electrical resistivity, a change in pressure on a deformable conductive material, which is made by dispersing conductive particles into non-conductive elastomer or synthetic rubber (See Patent Document 2).

PRIOR-ART DOCUMENTS

Patent Documents

Patent Document 1: Japanese Laid-open Patent Publication No. 2008-128940
Patent Document 2: Japanese Laid-open Patent Publication No. 2000-299016

SUMMARY OF THE INVENTION

By the way, if the motion of an object starting slipping on a slippage detection surface can be detected as the feeling of the slippage detection surface with a high degree of accuracy by using a small, lightweight and thin configuration, the feeling of a small finger, whose contact area with the object is small, when the finger is touching the object can be realized as in robot's hands for example. As a result, it can be considered that a holding means for holding the object with an appropriate holding force (not too strong or weak) may be realized.

The present invention has been made in view of the above points. The object of the present invention is to provide a slippage detection device and method that enable a slippage start state to be detected with the use of a small, lightweight and thin configuration.

To solve the above problems, the present invention provides: a slippage detection member 3 that includes a pressure-sensitive conductive sheet 3A provided on a contact receiving member 2 that receives contact with a contact member 5; a slippage detection signal formation circuit 31 that forms a slippage detection signal Vp containing a high-frequency waveform component VpX that occurs right before the occurrence of slippage displacement of the contact member 5 on the basis of a change in resistivity of the pressure-sensitive conductive sheet 3A in response to a detection signal S1 transmitted from the pressure-sensitive conductive sheet 3A at a time when the contact member 5 is pushed against the contact receiving member 2 via the pressure-sensitive conductive sheet 3A; and a slippage detection calculation section 36 that transmits a slippage confirmation signal S2 indicating the occurrence of initial slippage right before the occurrence of the slippage displacement at a time when a high-frequency waveform component VpX generated right before the occurrence of the slippage displacement exceeds a predetermined threshold value.

According to the present invention, when a contact member comes in contact with a contact receiving member via a pressure-sensitive conductive sheet, it is confirmed, on the basis of a change in resistivity of the pressure-sensitive conductive sheet and in response to a detection signal transmitted from the pressure-sensitive conductive sheet, that initial slippage has occurred right before the occurrence of slippage displacement, at a time when a high-frequency waveform component generated right before the occurrence of the slippage displacement of the contact member exceeds a predetermined threshold value. Therefore, it is possible to realize a slippage detection device whose slippage detection section is smaller, more lightweight and thinner.

MODE FOR CARRYING OUT THE INVENTION

Hereinafter, embodiments of the present invention will be described in detail with reference to the accompanying drawings.

(1) First Embodiment

Figure 1:
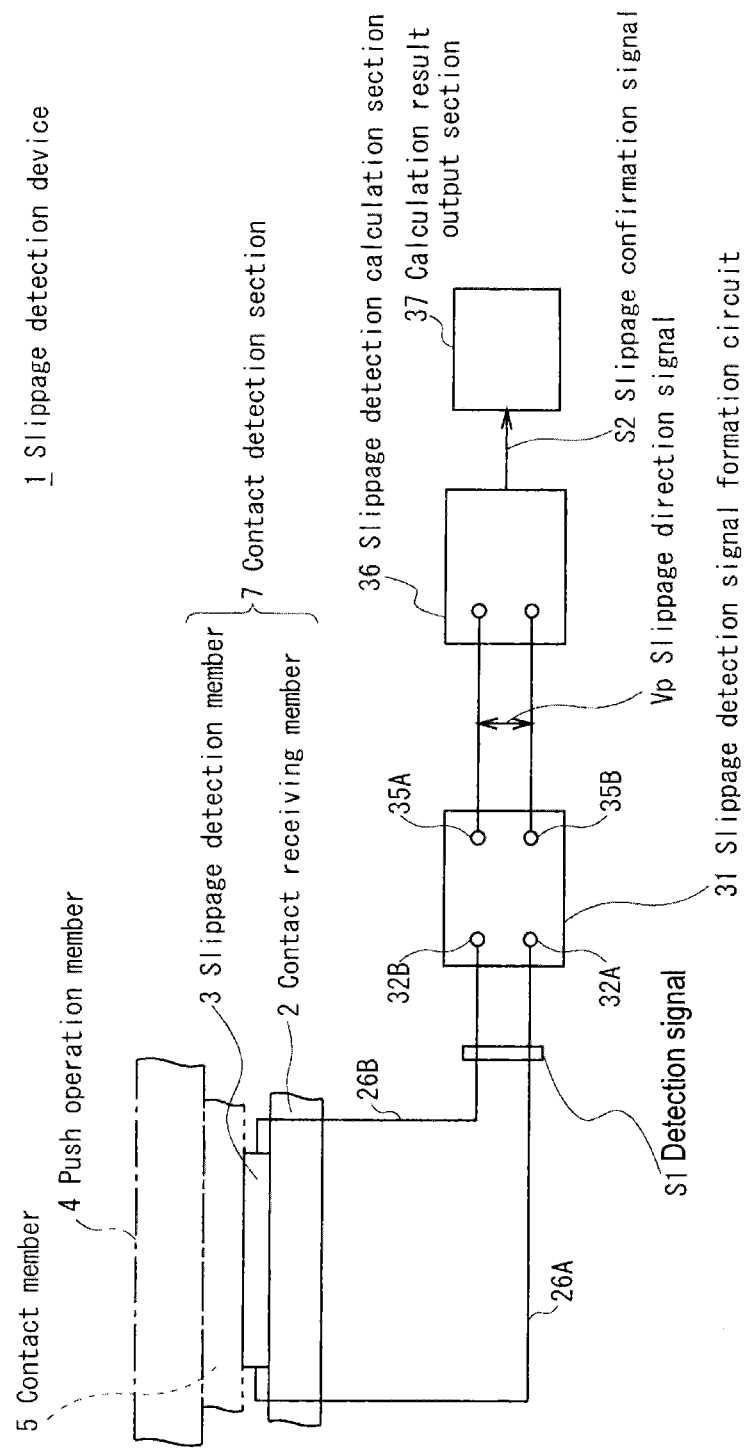
FIG. 1 is a schematic block diagram showing the overall configuration of a slippage detection device according to one embodiment of the present invention.

In FIG. 1, the reference numeral 1 represents a slippage detection device as a whole. To a surface of a contact receiving member 2 (which is for example a forefinger of a robot hand), a sheet-like slippage detection member 3 is attached and fixed. As a result, a contact detection section 7 is formed.

The contact receiving member 2 is designed to perform, when a contact member 5 made of an acrylic material starts performing a pinching operation with the help of a push operation member 4 (which is for example a thumb of a robot hand) in a way that faces the contact receiving member 2, a pinching/holding operation via the slippage detection member 3 on a surface facing the contact member 5.

Figure 2:
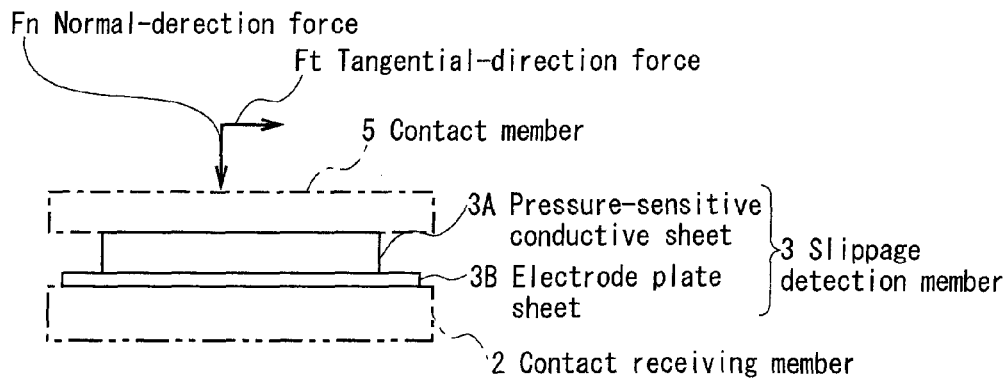
FIG. 2 is a schematic diagram showing the configuration of a contact detection section of FIG. 1.

As shown in FIG. 2, the slippage detection member 3 is formed so as to have an electrode plate sheet 3B that is integrally placed and fixed on one surface of a pressure-sensitive conductive sheet 3A. The electrode plate sheet 3B is bonded to the contact receiving member 2. Therefore, the slippage detection member 3 is provided on the contact receiving member 2.

Under the above situation, when the contact member 5 comes in contact with an upper surface of the pressure-sensitive conductive sheet 3A, what is applied from the contact member 5 to the upper surface of the pressure-sensitive conductive sheet 3A is a normal-direction force Fn, by which the pressure-sensitive conductive sheet 3A is compressed in a thickness direction. Another force applied to the surface of the pressure-sensitive conductive sheet 3A is a tangential-direction force Ft, by which the contact member 5 slides in the direction of a surface of the pressure-sensitive conductive sheet 3A.

Figure 3:
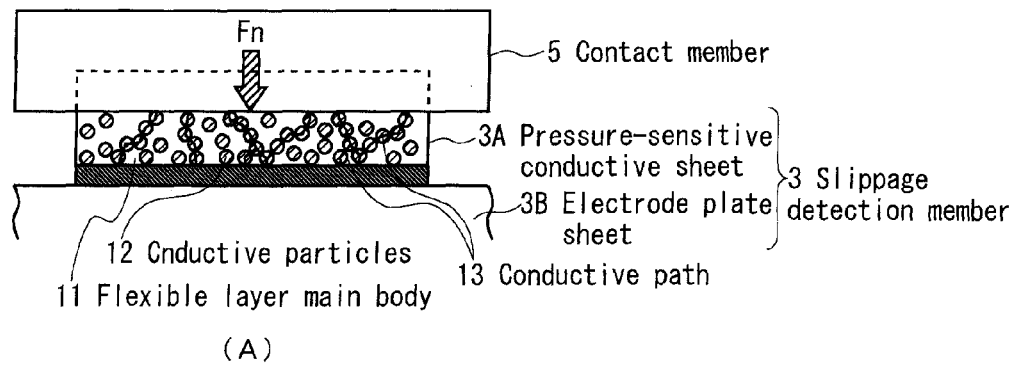
FIG. 3 is a schematic diagram illustrating a pressure-sensitive conductive sheet of FIG. 2.
Figure 3:
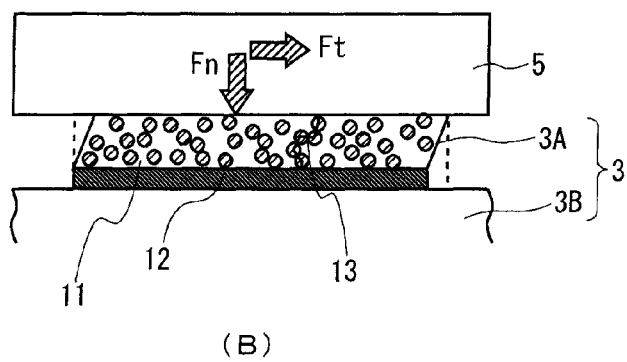

As shown in FIG. 3, the pressure-sensitive conductive sheet 3A is made of a deformable conductive material, which is made by dispersing conductive particles 12 into a flexible layer main body 11 such as non-conductive elastomer or synthetic rubber.

As a result, as shown in FIG. 3(A), when the normal-direction force Fn is applied to the contact member 5, the pressure-sensitive conductive sheet 3A performs a compression operation in between the contact member 5 and the electrode plate sheet 3B, thereby increasing the particles that are in contact in the normal direction among the conductive particles being dispersed in the flexible layer main body 11. Thus, in the thickness of the pressure-sensitive conductive sheet 3A, a large number of conductive paths 13 are created, leading to a decrease in internal resistance of the pressure-sensitive conductive sheet 3A.

Under the above situation, as the contact member 5 starts sliding due to the tangential-direction force Ft applied thereto, the conductive particles 12 moving away from each other increase in the flexible layer main body 11 as shown in FIG. 3(B), resulting in an increase in internal resistance of the pressure-sensitive conductive sheet 3A.

Figure 4:
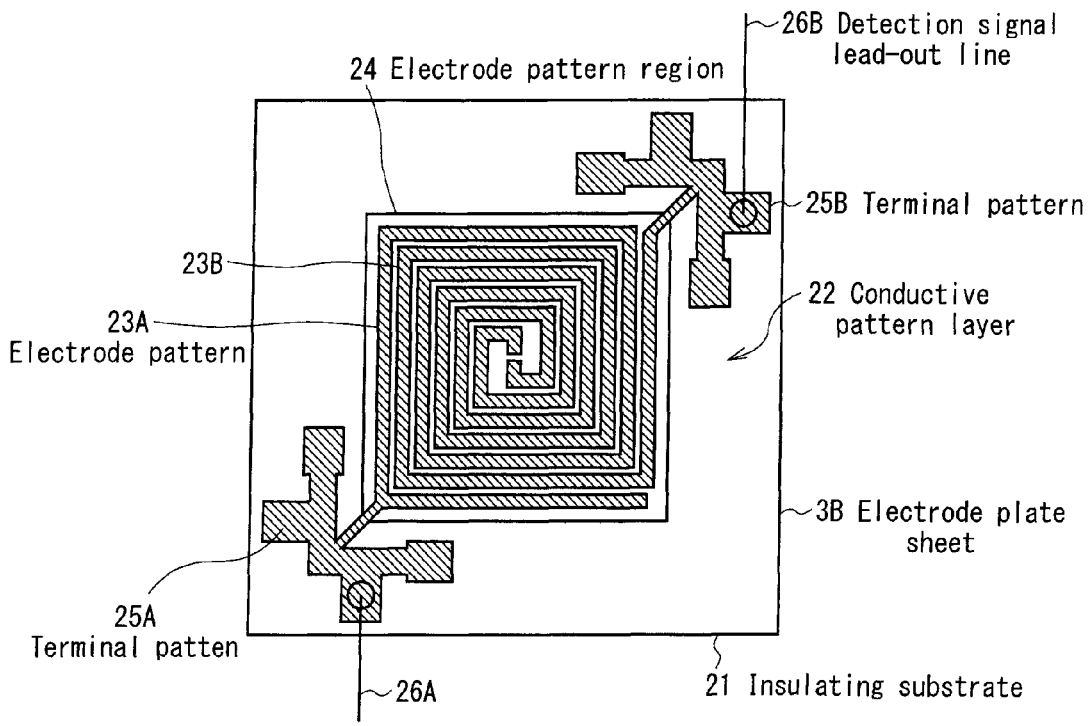
FIG. 4 is a schematic top view showing the detailed configuration of an electrode plate sheet of FIG. 2.
Figure 5:
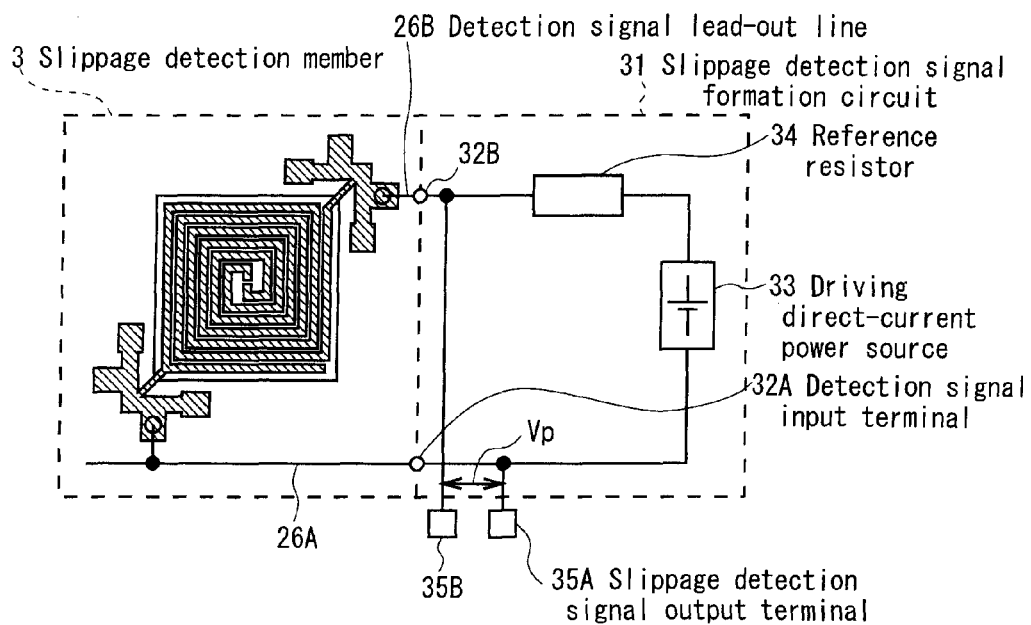
FIG. 5 is a schematic connection diagram showing the detailed configuration of a slippage detection signal formation circuit of FIG. 1.

According to the present embodiment, as shown in FIG. 4, the electrode plate sheet 3B is so formed as to have a conductive pattern layer 22 attached onto a surface of an insulating substrate 21.

At a central position of the conductive pattern layer 22, an electrode pattern region 24, which has two electrode patterns 23A and 23B formed in a square spiral manner, is provided. The electrode patterns 23A and 23B are respectively connected to two terminal patterns 25A and 25B, which are provided outside the electrode pattern region 24.

To the electrode pattern region 24, the pressure-sensitive conductive sheet 3A is bonded so that the electrode patterns 23A and 23B are electrically connected to a lower surface of the pressure-sensitive conductive sheet 3A. Accordingly, the electrical resistivity of an area of the pressure-sensitive conductive sheet 3A between the portions connected to the electrode patterns 23A and 23B can be led out between the terminal patterns 25A and 25B.

As a result, in between the terminal patterns 25A and 25B, when the pressure-sensitive conductive sheet 3A is deformed by the contact member 5, a change in resistance that occurs in the pressure-sensitive conductive sheet 3A is led, as a change in electrical resistivity between the terminal patterns 25A and 25B, out of the slippage detection member 3 to the outside via detection signal lead-out lines 26A and 26B, which are connected to the terminals 25A and 25B, as a detection signal S1.

The detection signal S1 is supplied to detection signal input terminals 32A and 32B of a slippage detection signal formation circuit 31 (FIG. 1).

According to the present embodiment, the detection signal input terminal 32A is connected to a negative-electrode side of a driving direct-current power source 33, whereas the detection signal input terminal 32B to a positive-electrode side terminal of the driving direct-current power source 33 via a reference resistor 34.

Figure 6:
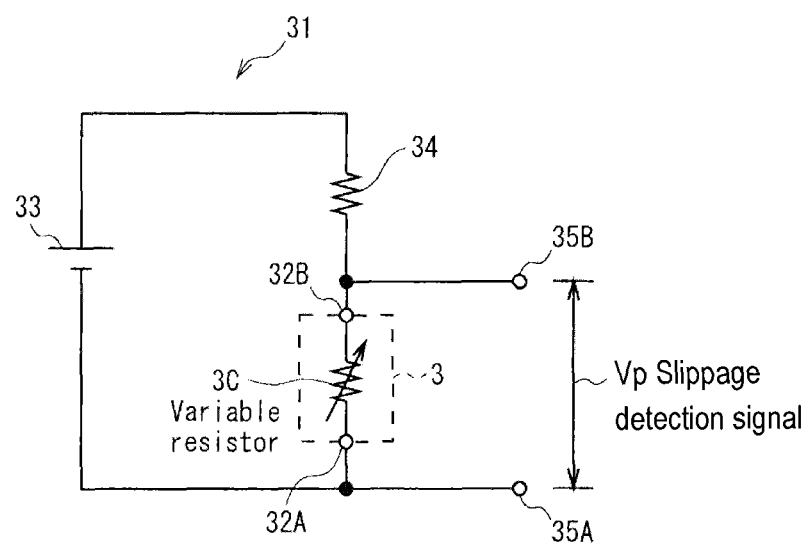
FIG. 6 is a connection diagram showing an equivalent circuit of the slippage detection signal formation circuit of FIG. 5.

As a result, the slippage detection signal formation circuit 31 connected to the slippage detection member 3 forms an equivalent circuit shown in FIG. 6.

In the equivalent circuit shown in FIG. 6, to both ends of the driving direct-current power source 33 of the slippage detection signal formation circuit 31, a series circuit of a variable resistor 3C, which is made up of the reference resistor 34 and the slippage detection member 3, is connected. Accordingly, the divided voltage obtained at both ends of the variable resistor 3C is output as a slippage detection signal Vp of the slippage detection signal formation circuit 31 to slippage detection signal output terminals 35A and 35B, which are led out from the detection signal input terminals 32A and 32B.

Therefore, the value of resistance of the pressure-sensitive conductive sheet 3A of the slippage detection member 3 varies because of the normal-direction force Fn and tangential-direction force Ft applied from the contact member 5. As a result, the value of the slippage detection signal Vp, which is the divided voltage of the driving direct-current power source 33, represents changes of the normal-direction force Fn and tangential-direction force Ft.

Figure 7:
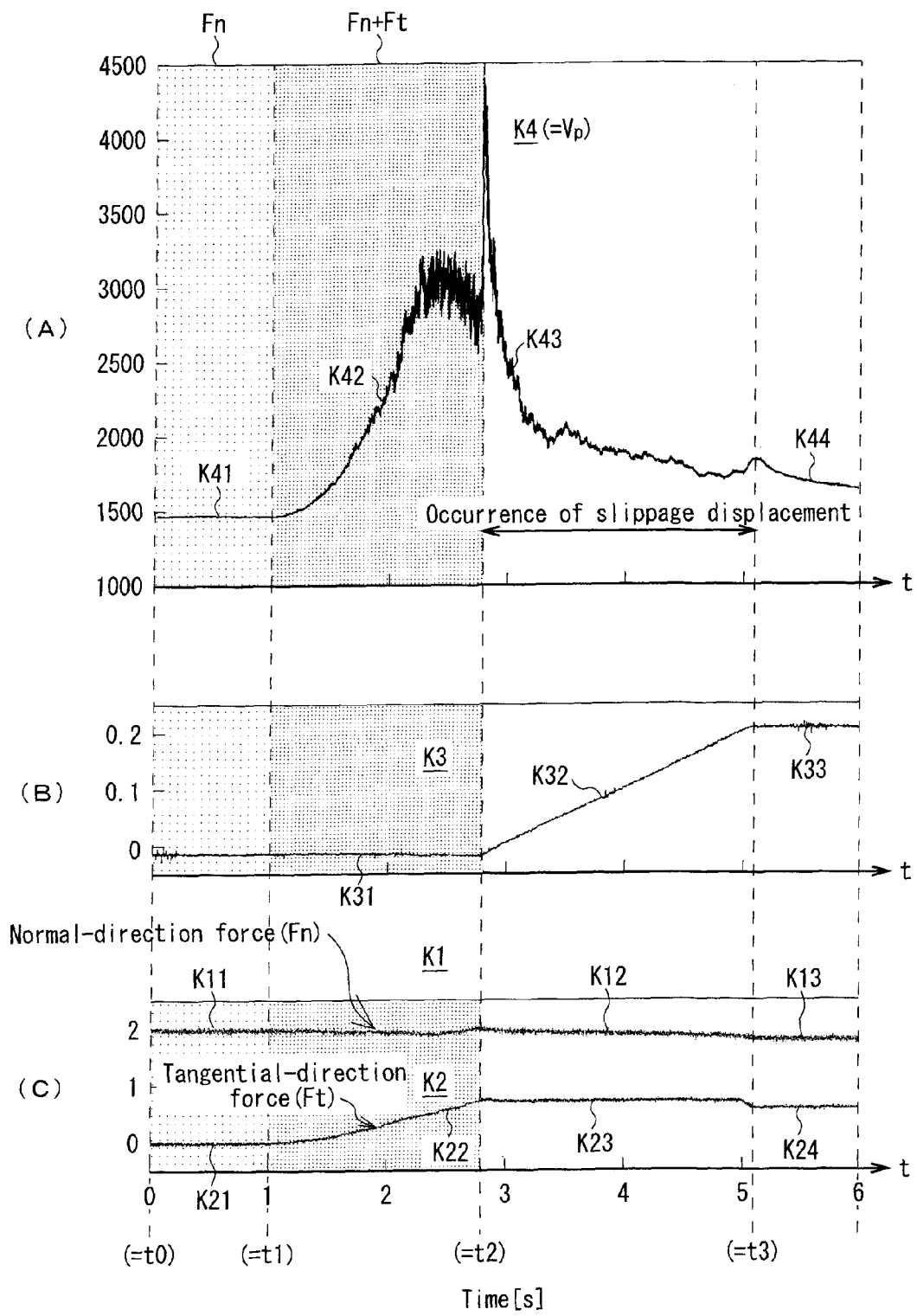
FIG. 7 is a signal waveform diagram illustrating an operation of a slippage detection member 3 of FIG. 1.

In experiments, in the case when the normal-direction force Fn is constantly applied in the normal direction to the pressure-sensitive conductive sheet 3A from the contact member 5 as indicated by a characteristic curve K1 in FIG. 7 (C) over a period of time t, the tangential-direction force Ft is gradually increased between time t1 and t2 after the tangential-direction force Ft is maintained at Ft=0 between time t0 to t1 as indicated by a characteristic curve K2. As a result, as indicated by a curve K32 of a curve K3 in FIG. 7(B), the contact member 5 slips and becomes displaced between time t=t2 to t3.

Based on the detection signal S1 of the slippage detection member 3 at the time, a specific electrical change in the value of the slippage detection signal Vp obtained across the output terminals 35A and 35B of the slippage detection signal formation circuit 31 occurs at a time when the contact member 5 starts sliding with respect to the slippage detection member 3 at t=t$_2$. A slippage detection calculation section 36, which includes a micro computer, confirms the specific electric change of the slippage detection signal Vp by performing a calculation process.

Therefore, when having obtained a slippage confirmation signal S2, the slippage detection calculation section 36 supplies the slippage confirmation signal S2 to a calculation result output section 37, thereby notifying a user of the fact that the slippage has occurred.

With the above configuration, the slippage detection calculation section 36 confirms, on the basis of the slippage detection signal Vp that indicates the motion of the slippage detection member 3 as shown in FIG. 7(A), the specificity of the electrical change thereof based on the signal calculation process.

A feature of the motion of the slippage detection member 3 shown in FIG. 7 can be detected based on the results of experiments on the slipping movements of the contact member 5 against the slippage detection member 3.

In FIG. 7(C), as indicated by the characteristic curve K1, in the case where the normal-direction force Fn is constantly applied by the contact member 5 to the pressure-sensitive conductive sheet 3A of the slippage detection member 3, when the tangential-direction force Ft is gradually increased during a period of t=t1 to t2 after a period of t=t0 to t1 when Ft=0, the contact member 5 starts slipping at time t=t2 as indicated by a characteristic curve K3 in FIG. 7(B), and stops slipping and being displaced at t=t3.

As for the above slippage and displacement of the contact member 5, on the basis of the detection signals S1 of the detection signal lead-out lines 26A and 26B of the electrode plate sheet 3B of the slippage detection member 3, the slippage detection signal Vp obtained across the output terminals 35A and 35B of the slippage detection signal formation circuit 31 generates a specific high-frequency signal waveform component during a period immediately before and after time t=t2 as indicated by a characteristic curve K4 in FIG. 7(A).

That is, during a period from time t=t0 to t1, only the normal-direction force Fn is applied as indicated by characteristic curves K11 and K21 in FIG. 7(C), and the slippage displacement is zero as indicated by a characteristic curve K31 in FIG. 7(B). During the above period, the slippage detection signal Vp is maintained at a constant value based on the normal-direction force Fn as indicated by a characteristic curve K41 in FIG. 7(A).

Then, during a period from t1 to t2, as the tangential-direction force Ft is gradually increased as indicated by a characteristic curve K22, the value of the slippage detection signal Vp sharply increases even when the slippage displacement is maintained at zero as indicated by the characteristic curve K31. Moreover, the value of the slippage detection signal Vp wildly fluctuates up and down toward the slippage start time t=t2. Then, the value of the slippage detection signal Vp changes in a way that forms a peak waveform at time t=t2.

After the slippage time t=t2, the contact member 5 slips and becomes displaced substantially linearly as indicated by a characteristic curve K32. Then, as indicated by a characteristic curve K33, the slippage displacement comes to an end at time t=t3.

During the period from t=t2 to t3 in which there is a change in the slippage displacement, as indicated by a characteristic curve K43, the slippage detection signal Vp sharply falls from a peak. At the same time, variation components on the falling curve become extremely smaller. After the slippage displacement comes to an end at t=t3, most of the fluctuation components disappear as indicated by a characteristic curve K44.

Based on the results of the experiments, when a high-frequency component is superimposed on the slippage detection signal Vp and when the range of the up-and-down fluctuation thereof exceeds a predetermined threshold value, the slippage detection calculation section 36 determines that the slippage and displacement of the contact member 5 is just about to occur.

According to the present embodiment, the slippage detection calculation section 36 performs a discrete wavelet transform process on the slippage detection signal Vp to detect the state of the slippage displacement that is just about to occur.

Figure 8:
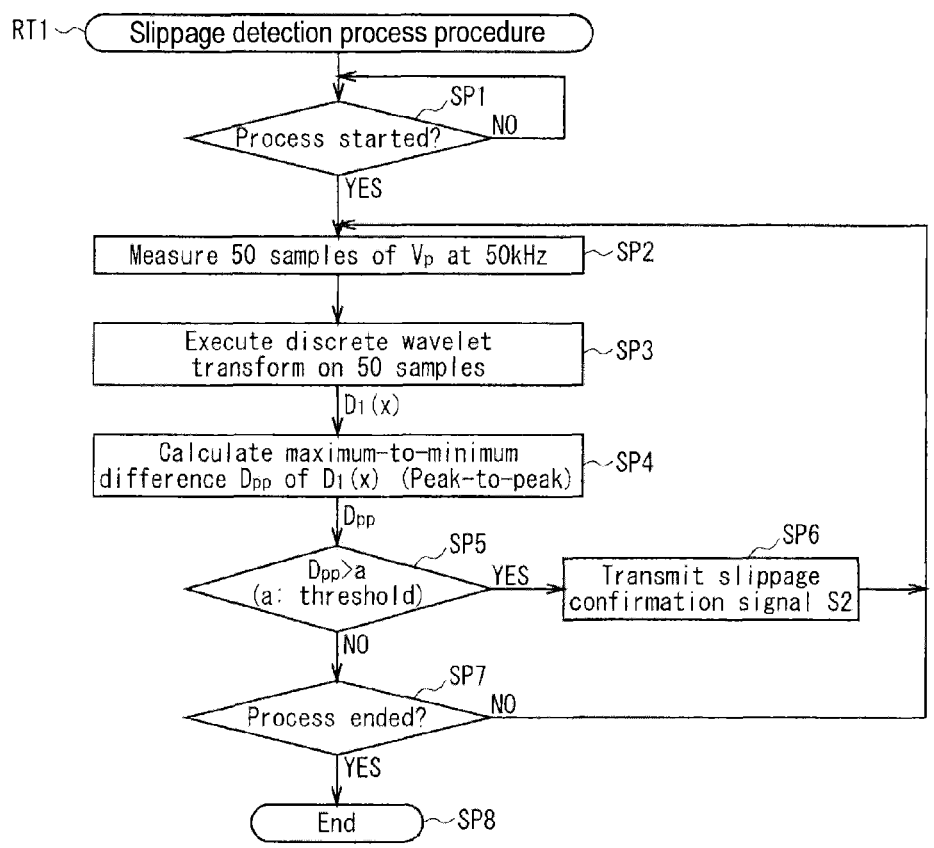
FIG. 8 is a flowchart illustrating an operation of a slippage detection calculation section 36 of FIG. 1.

The slippage detection calculation section 36 forms the slippage confirmation signal S2 from the slippage detection signal Vp through a slippage detection process procedure RT1 shown in FIG. 8.

After entering the slippage detection process procedure RT1, a central processing unit (CPU) of the slippage detection calculation section 36 at step SP1 waits for a process start instruction coming from a user. Then, at step SP2, the CPU of the slippage detection calculation section 36 executes a discrete wavelet transform process.

The CPU of the slippage detection calculation section 36 at step SP2 counts 50 samples of the slippage detection signal Vp at a frequency of 50 [Hz] before proceeding to step SP3, where the following equation is used to perform a discrete wavelet transform process for the 50 samples:

$$D_1(x) = \sum_{k=0}^{24} d_k \Psi_H\left(\frac{x}{2} - k\right) \quad (1)$$

$$dn = \frac{1}{2}(a_{2n} - a_{2n+1})$$

$$(n = 0, 1, \ldots, 24)$$

where $\Psi_H(x)$ in Equation (1) has the following relation in Haar wavelet:

$$\phi_H(x) = \begin{cases} 1 & \left(0 \leq x < \frac{1}{2}\right) \\ -1 & \left(\frac{1}{2} \leq x < 1\right) \\ 0 & \text{(Other cases)} \end{cases} \quad (2)$$

In the above equations (1) and (2), x represents time t. At the above step SP3, the discrete wavelet transform process is as follows:

$$\phi_H(t) = 1\left(0 \leq t < \frac{1}{2}\right) \quad (3)$$

In this manner, time t is specified in a high-frequency range as shown below:

$$0 \leq t < \frac{1}{2} \quad (4)$$

Accordingly, the occurrence and magnitude of high-frequency components in the slippage detection signal Vp are calculated as discrete wavelet transform output $D_1(x)$ as time advances.

Therefore, the CPU of the slippage detection calculation section 36 obtains the discrete wavelet transform output $D_1(x)$, thereby obtaining a result of extracting a high-frequency component from the slippage detection signal Vp.

In FIG. 9(B), wavelet coefficients, which are obtained by performing a discrete wavelet transform process on the slippage detection signal Vp shown in FIG. 9(A), are plotted.

Figure 9:
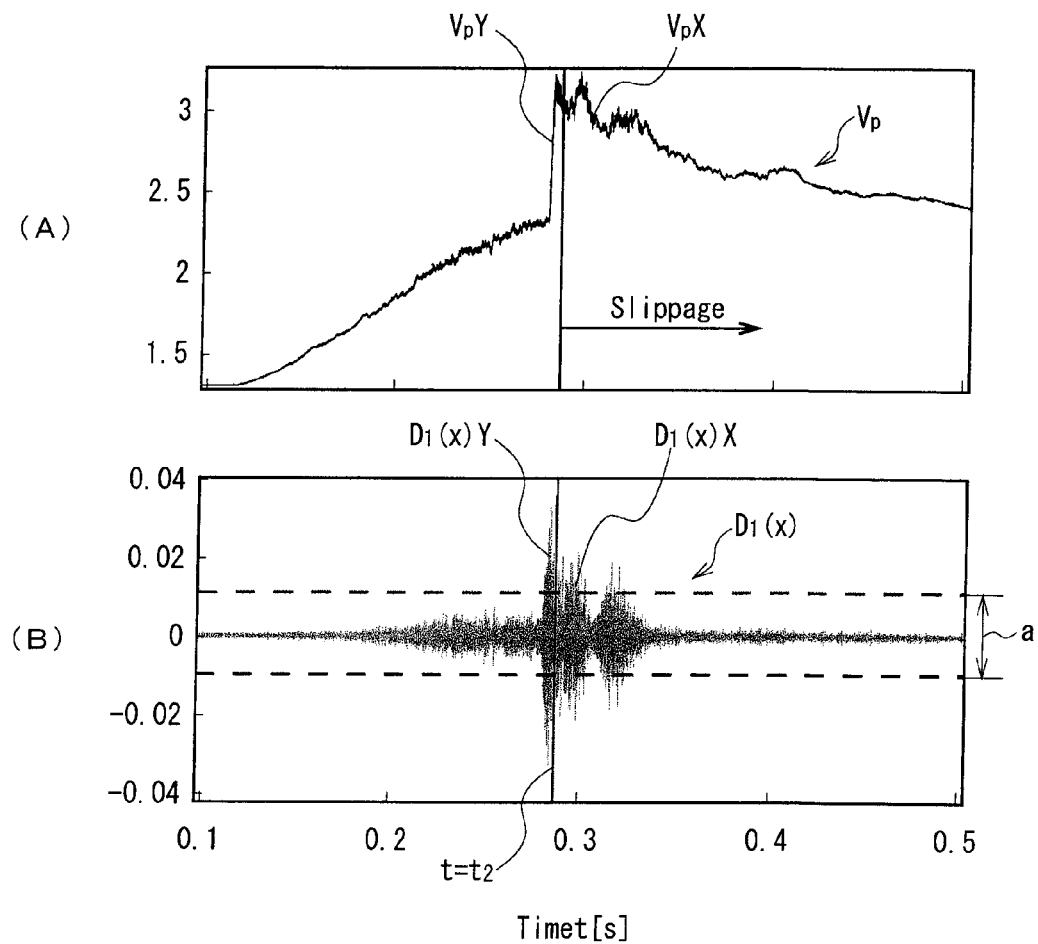
FIG. 9 is a signal waveform diagram illustrating a discrete wavelet transform process at step SP3 of FIG. 8.

According to FIG. 9, the value of the wavelet coefficient $D_1(X)$ records a maximum value immediately before time t=t2, when the slippage and displacement of the contact member 5 occur. It is therefore clear that there are many large high-frequency components in the slippage detection signal Vp at the time.

The CPU of the slippage detection calculation section 36 at the subsequent step SP4 calculates a difference Dpp between the maximum and minimum values (i.e. peak-to-peak value) of the wavelet coefficient $D_1(X)$, and then makes a determination at step SP5 as to whether the peak-to-peak value Dpp is larger than threshold value a.

An affirmative result obtained at step SP5 means that, immediately before time t=t2 when the slippage and displacement of the contact member 5 occurs, the contact member 5 induces a transition operation from a "just-about-to-start-slipping state" (referred to as initial slippage) to "start-slipping state," and the start of the slippage and displacement of the contact member 5 immediately after the above can be anticipated.

"Initial slippage" can be defined as follows.

Normal slippage represents the state of a rigid body as a whole moving on a surface, whereas initial slippage represents the situation where such a phenomenon has not yet taken place.

In experiments, as described above in FIG. 7, the tangential-direction force Ft is applied to a rigid body, and the travel distance of the rigid body is measured by a laser sensor. At a time when the travel distance is zero (FIG. 7(C)), initial slippage is detected in the output of the sensor (FIG. 7(A)).

The slippage between objects that are in contact with each other occurs at a time when, within a contact region surface, "separations" of contact gradually start occurring from the periphery thereof and spread to the entire contact region.

At this time, during the transition process from the "just-about-to-start-slipping state" to the "start-slipping state," there is a mixed state of "separations" within the contact surface and firmly-bonded areas. In the present specification, the just-about-to-start-slipping state described above will be referred to as "initial slippage."

Meanwhile, a completely-separated state, in which firmly-bonded areas have disappeared, will be referred to as "complete slippage" or "entire slippage."

What is simply described as "slippage" of an object means complete or entire slippage.

At the time, the CPU of the slippage detection calculation section 36 proceeds to step SP6, and transmits a slippage confirmation signal S2 to the calculation result output section 37.

At the time, the calculation result output section 37 performs a displaying operation, such as turning on a LED for example, to notify a user of the occurrence of the slippage. Then, the process returns to the above step SP2, where a new sample measurement process continues.

On the other hand, a negative result obtained at step SP5 means that initial slippage has not taken place on the contact member 5. In this case, the CPU of the slippage detection calculation section 36 at step SP7 makes a determination as to whether a user has input a slippage detection process end instruction. When a negative result is obtained, the process goes back to the above step SP2, where a new sample measurement operation starts.

On the other hand, when an affirmative result is obtained at step SP7, the slippage detection calculation section 36 proceeds to step SP8 and ends the process of the slippage detection process procedure RT0.

With the above configuration, when the contact member 5 comes in contact with the slippage detection member 3 provided on the surface of the contact receiving member 2, a change in resistivity occurs on the pressure-sensitive conductive sheet 3A. Based on the change, a slippage detection signal Vp (FIG. 9(A)) is obtained from the slippage detection signal formation circuit 31. Then, the CPU of the slippage detection calculation section 36 starts executing the slippage detection process procedure RT1 (FIG. 8). In this manner, in order to detect the occurrence of initial slippage on the basis of changes of high-frequency components contained in the slippage detection signal Vp, the slippage detection process is carried out with a loop of steps SP2-SP3-SP4-SP5-SP7-SP2.

After it is determined at step SP5 by the slippage detection calculation section 36 that the peak-to-peak value Dpp of the wavelet coefficient $D_1(x)$ has exceeded the threshold value a, the CPU at step SP6 outputs a slippage confirmation signal S2 to the calculation result output section 37.

At the time, the contact member 5 is in the initial-slippage state, in which the contact member 5 is just about to start slipping and being displaced with respect to the slippage detection member 3. Thus, the slippage detection device 1 can anticipate in advance that the initial-slippage state would appear right before the occurrence of the slippage displacement.

The above configuration enables the slippage detection device 1 to anticipate in advance, right before the contact member 5 comes in contact with the contact receiving member 2 and starts slipping, the event as the occurrence of initial slippage (i.e. to perform a slippage anticipation operation). Thus, on the basis of the results of the slippage anticipation, a user can take steps in advance to prevent the occurrence of slippage displacement by increasing the force of holding the contact member 5, or by doing other operations, for example. In this manner, it is possible to carry out a process for preventing the falling of the contact member 5.

Therefore, according to the above-described embodiment, as the slippage detection member 3, as shown in FIG. 2, a simple, small and thin structure can be realized with the pressure-sensitive conductive sheet 3A provided on the electrode plate sheet 3B.

Figure 10:
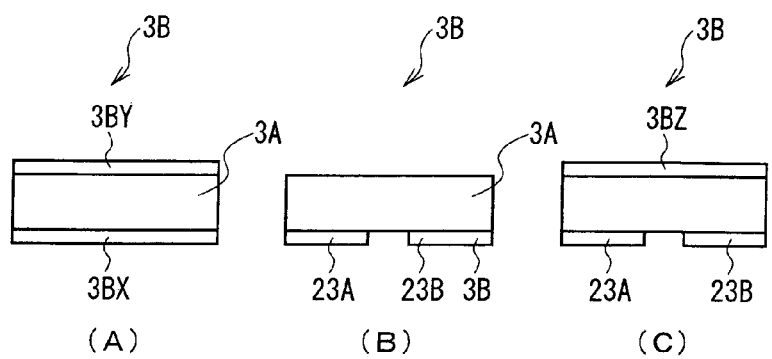
FIG. 10 is a schematic diagram illustrating another embodiment of the slippage detection member 3 of FIG. 1.
Figure 11:
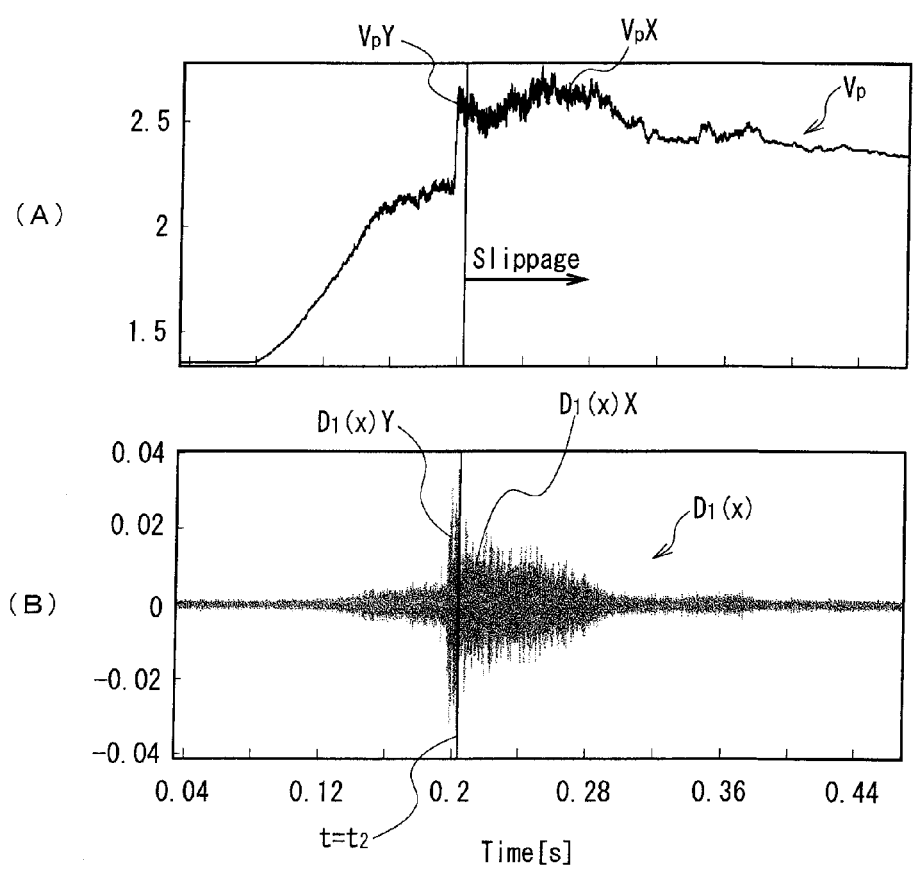
FIG. 11 is a signal waveform diagram illustrating a wavelet transform process when a stainless material is used for a contact member 5.
Figure 12:
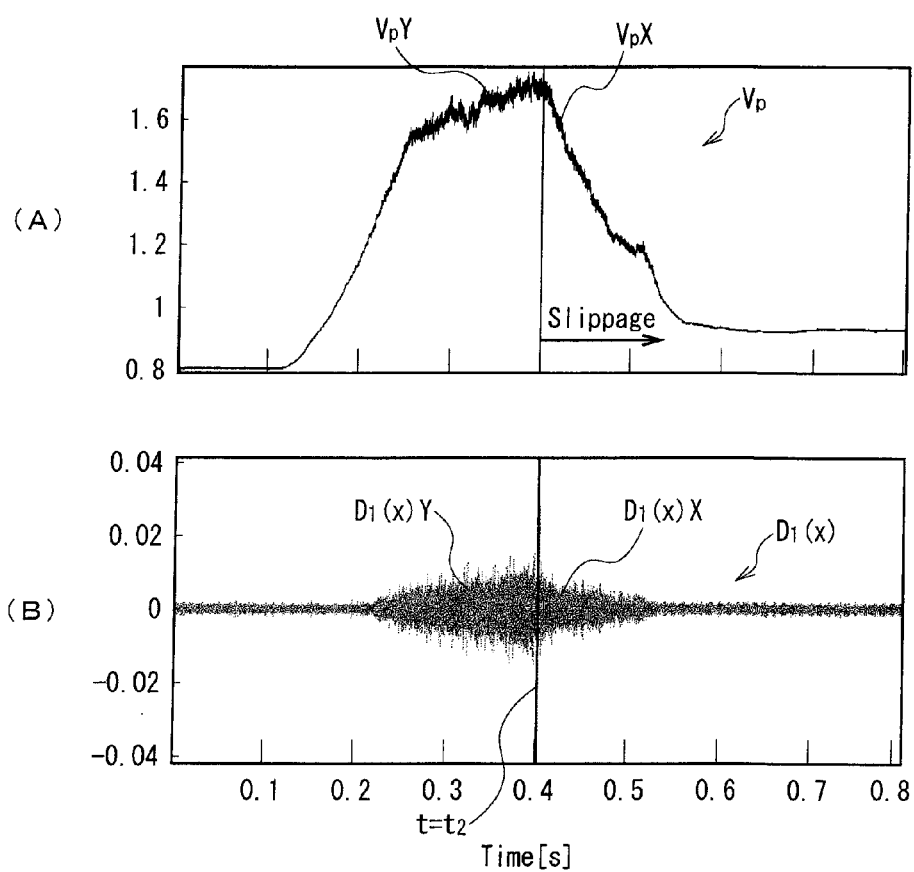
FIG. 12 is a signal waveform diagram illustrating a wavelet transform process when a fabric material is used for a contact member 5.
Figure 13:
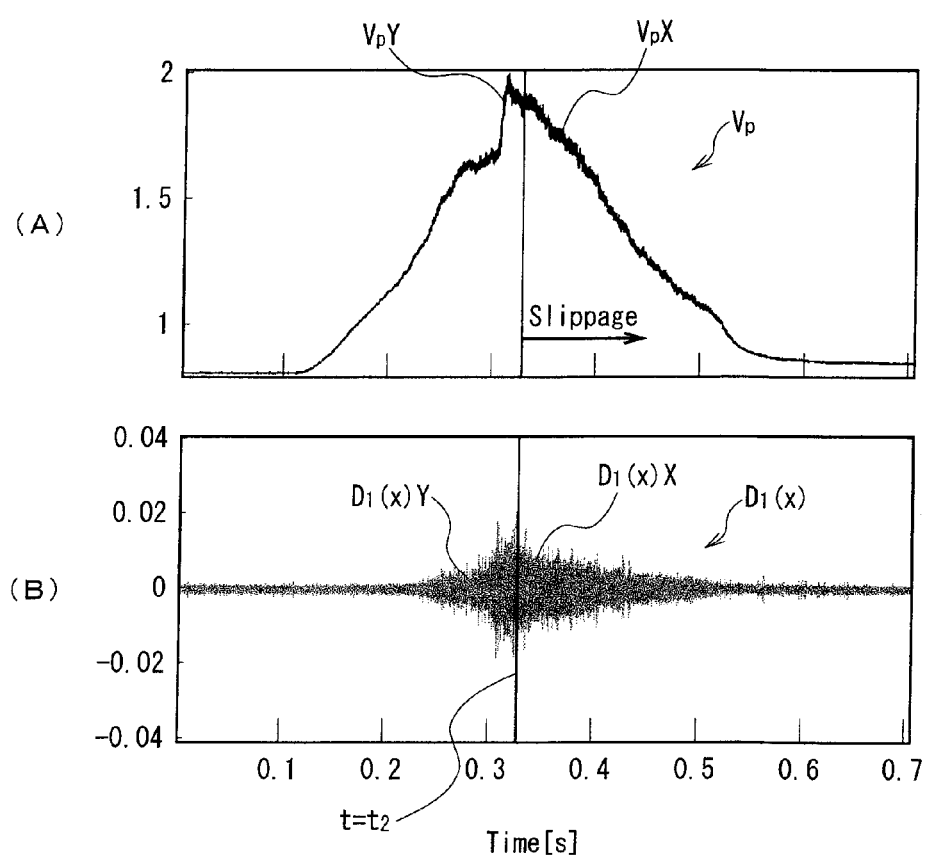
FIG. 13 is a signal waveform diagram illustrating a wavelet transform process when a paper material is used for a contact member 5.
Figure 14:
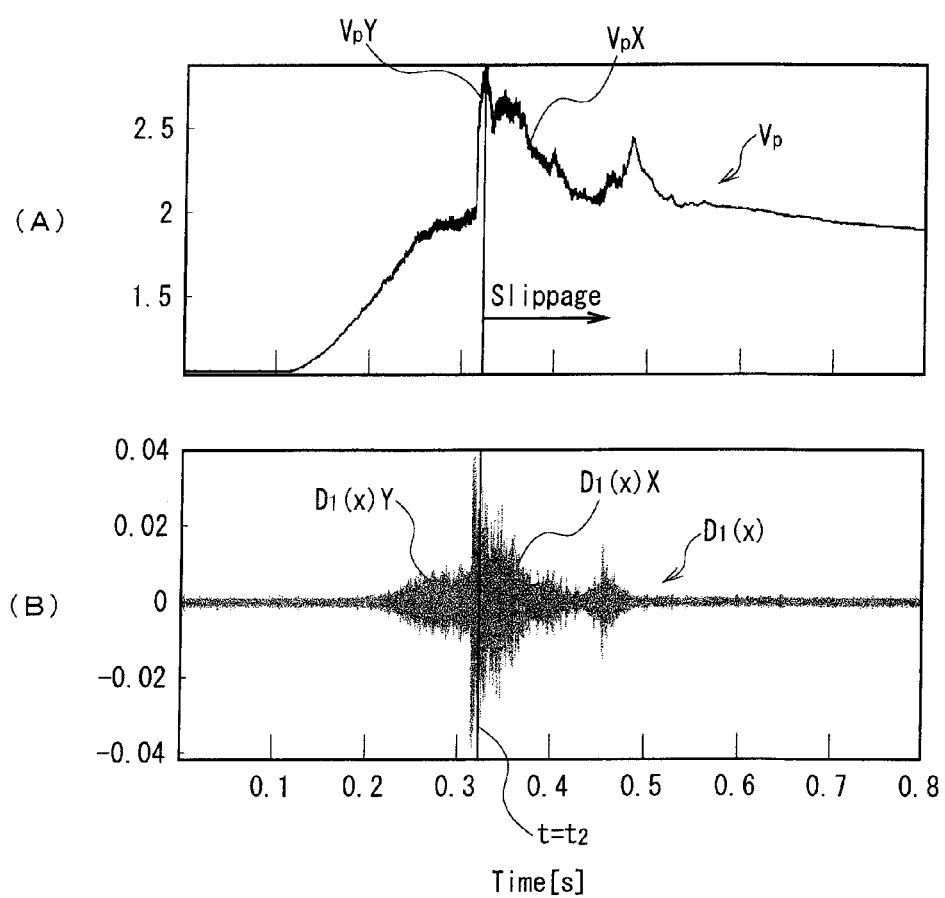
FIG. 14 is a signal waveform diagram illustrating a wavelet transform process when a wooden material is used for a contact member 5.
Figure 15:
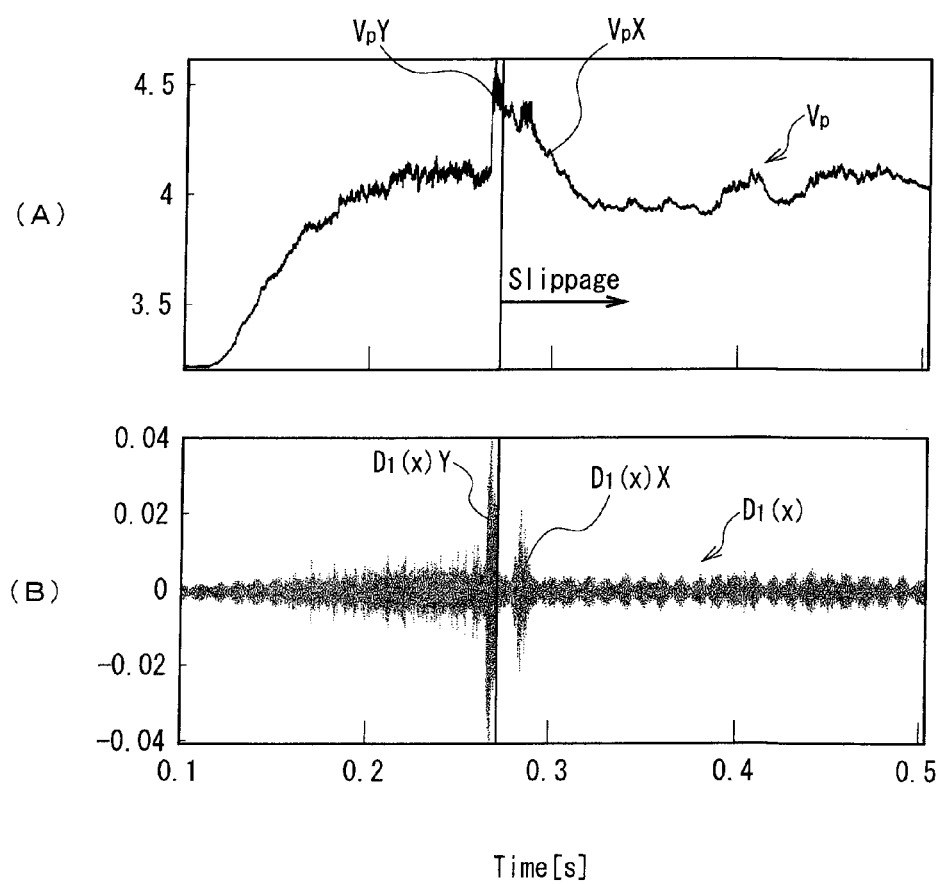
FIG. 15 is a signal waveform diagram illustrating a wavelet transform process when an acrylic material is used for a contact member 5 with an initial load of 2 [N] and a slip velocity of 10 [mm/s].
Figure 16:
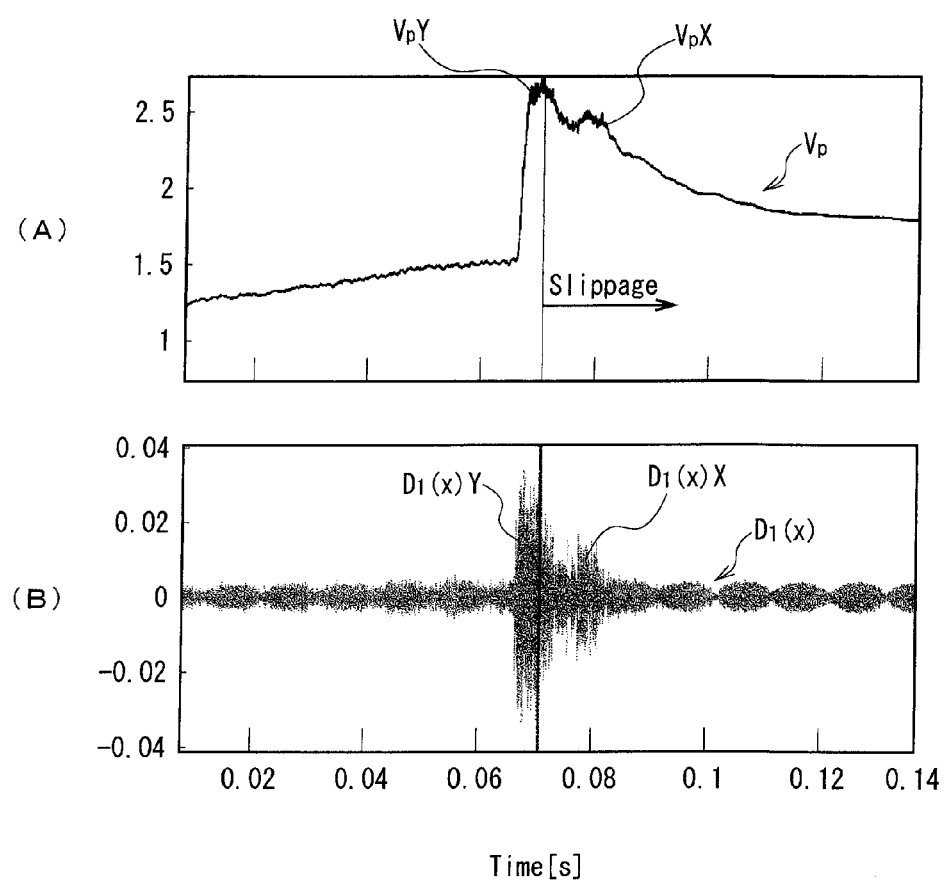
FIG. 16 is a signal waveform diagram illustrating a wavelet transform process with an initial load of 4 [N] and a slip velocity of 10 [mm/s], in contrast to FIG. 15.
Figure 17:
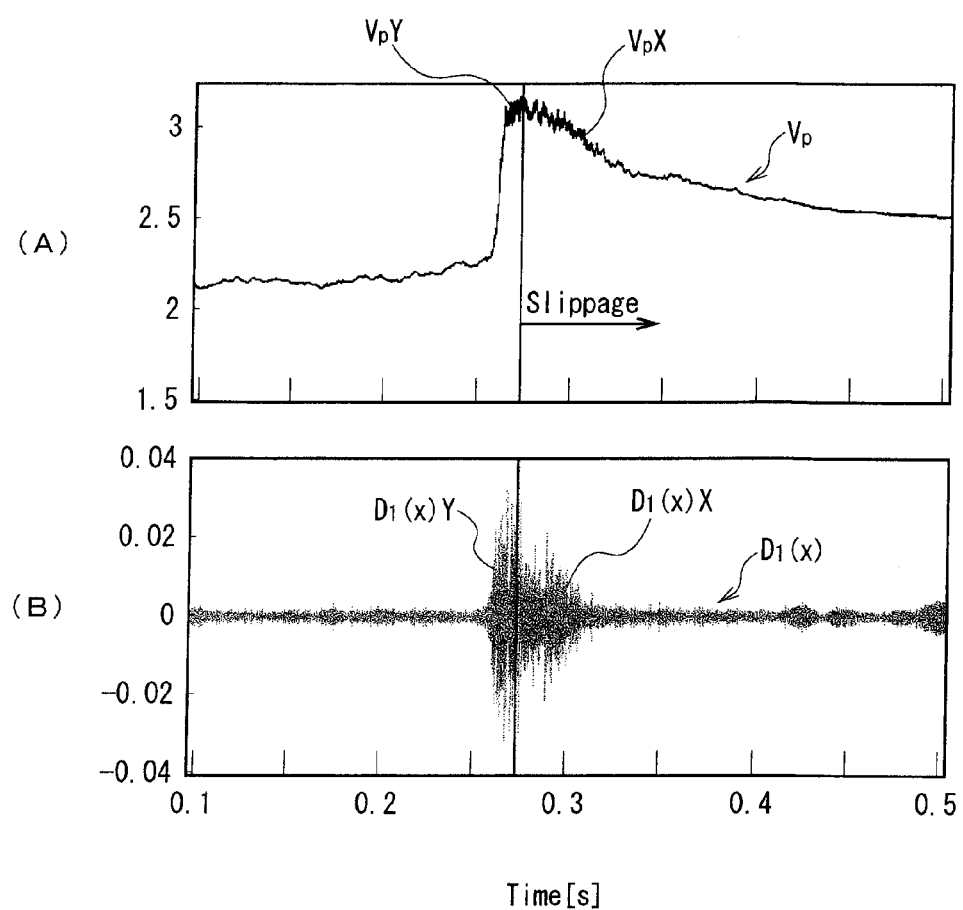
FIG. 17 is a signal waveform diagram illustrating a wavelet transform process with an initial load of 3 [N] and a slip velocity of 1 [mm/s], in contrast to FIG. 15.
Figure 18:
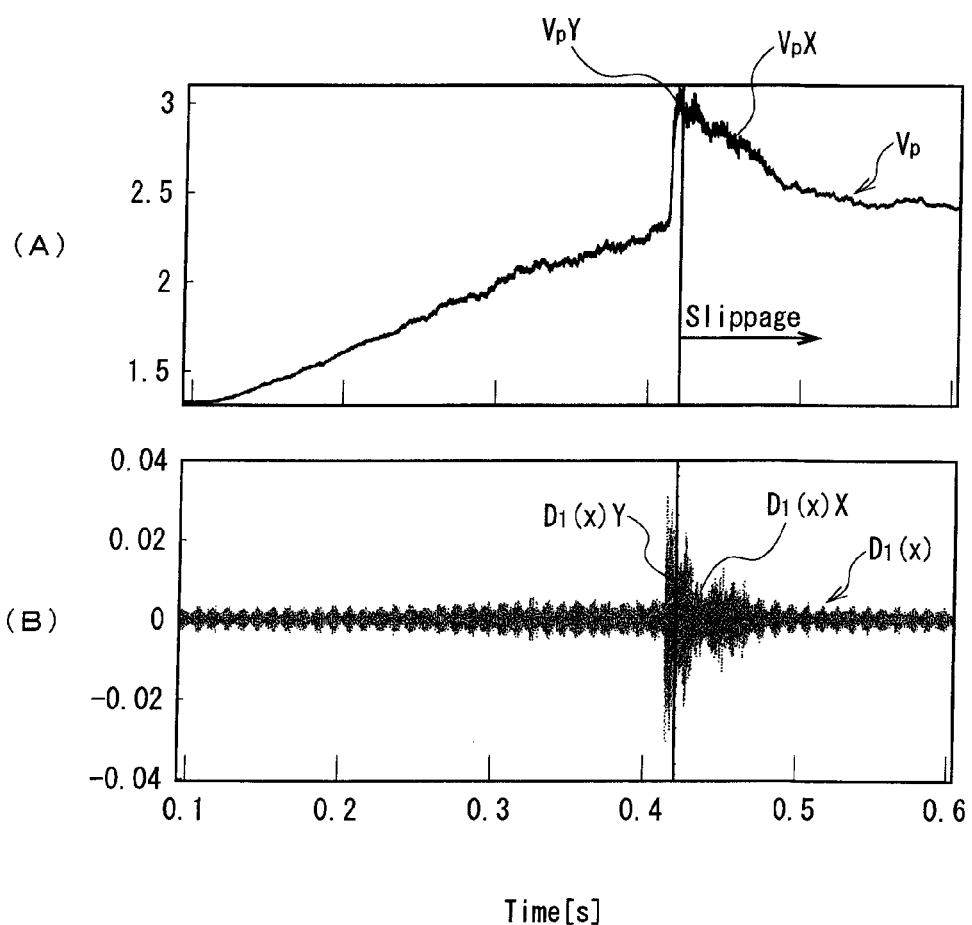
FIG. 18 is a signal waveform diagram illustrating a wavelet transform process with an initial load of 3 [N] and a slip velocity of 5 [mm/s], in contrast to FIG. 15.

(2) Other Embodiments (2-1) According to the above-described embodiment, as the slippage detection member 3 as described above in FIGS. 2 and 4, two electrode patterns 23A and 23B are provided on one side of the pressure-sensitive conductive sheet 3A as shown in FIG. 10(B). However, the way that the electrode plate sheet 3B is provided is not limited to the above. As shown in FIG. 10(A), one electrode pattern 3BX or 3BY may be provided for each of both surfaces of the pressure-sensitive conductive sheet 3A. Alternatively, as shown in FIG. 10(C), two electrode patterns 23A and 23B may be provided on one side, and one electrode pattern 3BZ on the other side.

As described above, all that is required is the electrode plate sheet 3B that can lead out, when the normal-direction force Fn or tangential-direction force Ft is applied to the pressure-sensitive conductive sheet 3A, a resistance value that varies according to the force from the pressure-sensitive conductive sheet 3A.

(2-2) According to the above-described embodiment, for the signal that represents initial slippage with a high-frequency component that occurs right before the occurrence of slippage displacement in the slippage detection signal Vp obtained from the slippage detection signal formation circuit 31, the discrete wavelet transform, defined by the above equations (1) and (2), is used. However, the continuous wavelet transform defined by the following equation may be used instead:

$$f_j(x) = f_{j-1} - g_{j-1} \quad (5)$$
$$= \sum_K \left( c_k^{(j-1)} \phi(2^{j-1}x - k) + d_k^{(j-1)} \phi(2^{j-1}x - k) \right)$$
$$c_k^{(j-1)} = \frac{1}{2} \sum_K g_{2k-1} c_1^{(j)}$$
$$d_k^{(j-1)} = \frac{1}{2} \sum_K h_{2k-1} c_1^{(j)}$$

The continuous wavelet transform is preferably employed for the case where the slippage detection signal Vp is to be frequency-analyzed in detail. The continuous wavelet transform is used to find out which frequency occurs at what time and how strong the frequency is.

However, the continuous wavelet transform requires large amounts of calculation. Therefore, the discrete wavelet transform used in the above-described embodiment is more suitable for high-speed processing.

Incidentally, the discrete wavelet transform used in the above-described embodiment is more like a process of separating the slippage detection signal Vp into high-frequency and low-frequency components than a process of frequency-analyzing the slippage detection signal Vp.

According to the above-described embodiment, the discrete wavelet transform is used to separate the slippage detection signal Vp into high-frequency and low-frequency components; the high-frequency components are used to detect the slippage.

(2-3) According to the above-described embodiment, signal processing involving the discrete wavelet transform is used at a time when high-frequency components are extracted from the slippage detection signal Vp. Carrying out the discrete wavelet transform effectively means making signals pass through a high-pass filter.

Therefore, for example, even if a high-pass filter with a cutoff frequency of 1 [kHz] or more, or an equivalent band-pass filter is used with the use of a FIR filter, an IIR filter or the like instead of the discrete wavelet transform, the same advantageous effects as in the above case can be obtained.

(2-4) According to the above-described embodiment, for the contact member 5 that comes in contact with the slippage detection member 3, an acrylic material is used. However, the material of the contact member 5 is not limited to the acrylic material. As shown in FIG. 11, 12, 13 or 14, even when a stainless, fabric, paper or wooden material is used, it is confirmed that high-frequency components VpX appear in corresponding slippage displacement occurrence periods in the slippage detection signals Vp, and that high-frequency components VpY, which indicate initial slippage, occur at slippage start time t=t2.

Accordingly, as shown in FIG. 11(B), 12(B), 13(B) or 14(B), as in the above case illustrated in FIG. 9, high-frequency components $D_1$ (X) X associated with slippage are obtained for the wavelet coefficient $D_1$ (X). Moreover, high-frequency components $D_1$ (X) Y associated with initial slippage appear.

Accordingly, even when a different material is used for the contact member 5, it is possible to ensure that the occurrence of initial slippage is detected right before the occurrence of slippage displacement as in the above case described in FIG. 9.

(2-5) As described above in FIG. 9, when the contact member 5 is made of an acrylic material, initial slippage can be detected.

In the case where the acrylic material is used, even when the initial load and the slip velocity are changed, it is possible to detect initial slippage as shown in FIG. 15, 16, 17 or 18.

Incidentally, in the case of FIG. 15(A), 16(A), 17(A) or 18(A), even when the initial load and the slip velocity are 2 [N] and 10 [mm/s], 4 [N] and 10 [mm/s], 3 [N] and 1 [mm/s], or 3 [N] and 5 [mm/s], high-frequency components VpX associated with the occurrence of slippage displacement, as well as high-frequency components VpY associated with the occurrence of initial slippage, occur in corresponding slippage detection signals Vp (FIG. 15(B), 16(B), 17(B) or 18(B)). Accordingly, in the wavelet coefficients $D_1$ (X), high-frequency components $D_1$ (X) X associated with the occurrence of slippage displacement, as well as high-frequency components $D_1$ (X) Y associated with initial slippage, occur. In either case, as in the case described above in FIG. 9, it is possible to ensure that the initial slippage that occurs right before slippage displacement occurrence time t=t2 is detected.

(2-6) The slippage detection device and method of the above-described embodiment can be applied for use in the following situations.

(2-6-1) Holding Operation by Robot Hand

The above-described slippage detection device is characterized as flexible, thin and lightweight. Therefore, the slippage detection device can be disposed on a small surface at the tip of a finger of a robot hand. A sensor can also be disposed in a broad region, such as a palm, if necessary. By mounting the above-described slippage detection device on a robot, it is possible to enable the robot to feel an object coming in contact with a finger of the robot's hand. Moreover, since initial slippage can be detected, it is possible to prevent the slippage of an object by detecting, at the tip of the finger, an object that is about to slip, and adjusting the holding force. Even when there is a change in the weight of an object or friction coefficients, it is possible to hold the object with appropriate holding power (not too strong or weak) by using a sense of "slippage."

(2-6-2) Application to Artificial Arm (Tactile-Sense Feedback)

As described above, there must be a sense of "slippage" for realizing a skillful operation of handling, such as the action of "holding an object" or handling a tool. A system in which a sensor capable of detecting a contact force is attached to an artificial arm and a feedback process is performed has been so far tried. However, when a soft paper cup is held, it is necessary to visually confirm whether the object is grabbed. Therefore, it takes time and effort to get accustomed to a certain degree. That is, since objects to be held are different in weight, friction coefficient and other factors, a user is not sure whether an object is properly held even if the user knows how much power the use exerts. Therefore, if the "slippage of an object" can be detected by the slippage detection device of the above-described embodiment and if a feedback process is performed, it is possible to hold an object, as well as to adjust the force so that the object does not drop and get crushed.

(2-6-3) Input Device, Interface

The above-described slippage detection device is able to detect contact and initial slippage. Therefore, when the slippage detection device is used as an input device, it is possible to detect the action of a finger pushing a button, or of a finger sliding laterally. Moreover, when the above-described slippage detection device is used in combination with a sensor able to detect CoP, it becomes also possible to figure out in which direction a finger is sliding. Thus, the slippage detection device may be used for the movement of a mouse cursor on a small device, such as a cellular phone, or for any other case.

INDUSTRIAL APPLICABILITY

The present invention can be used for the case where a contact member comes in contact with a contact receiving member as in the case of robot's hands, and initial slippage thereof is to be detected.

EXPLANATION OF REFERENCE SYMBOLS

1: Slippage detection device
2: Contact receiving member
3: Slippage detection member
3A: Pressure-sensitive conductive sheet
3B: Electrode plate sheet
4: Push operation member
5: Contact member
7: Contact detection section
21: Insulating substrate
22: Conductive pattern layer
23A, 23B: Electrode pattern
24: Electrode pattern region
25A, 25B: Terminal pattern
26A, 26B: Detection signal lead-out line
31: Slippage detection signal formation circuit
32A, 32B: Detection signal input terminal
33: Driving direct-current power source
34: Reference resistor
35A, 35B: Slippage detection signal output terminal
36: Slippage detection calculation section
37: Calculation result output section

The invention claimed is:

1. A slippage detection device, comprising:
a slippage detection member in which a pressure-sensitive conductive sheet, which is made by dispersing conductive particles in a flexible layer main body, is disposed on a contact receiving member, with a resistivity value of the pressure-sensitive conductive sheet determined by the state of contact of the dispersed conductive particles at a time when a tangential-direction force is applied to a surface of the flexible layer main body after a normal-direction force is applied thereto;
a slippage detection signal formation circuit that forms a slippage detection signal containing a high-frequency oscillation waveform component that occurs right before the occurrence of slippage displacement of a contact member, on the basis of a change in resistivity of the pressure-sensitive conductive sheet that is caused by a change in the dispersion arrangement state of the conductive particles in the flexible layer main body right before the contact member starts slipping and becoming displaced with respect to the contact receiving member, at a time when the contact member is pushed against the contact receiving member via the pressure-sensitive conductive sheet and then the contact member is pushed against the contact receiving member in a direction of slippage; and
a slippage detection calculation section that transmits a slippage confirmation signal indicating the occurrence of initial slippage right before the occurrence of the slippage displacement from the occurrence of the high-frequency oscillation waveform component and the magnitude thereof exceeding a predetermined threshold value.

2. The slippage detection device according to claim 1, wherein
the slippage detection member is provided with electrode plate sheets on one or both sides of the pressure-sensitive conductive sheet, and therefore transmits the detection signal indicating a change in resistivity of the pressure-sensitive conductive sheet from the electrode sheets.

3. The slippage detection device according to claim 1, wherein
the slippage detection calculation section includes discrete wavelet transform means for performing a discrete wavelet transform process on the slippage detection signal.

4. A slippage detection method, comprising:
a step of forming in a slippage detection signal formation circuit a slippage detection signal containing a high-frequency oscillation waveform component that occurs right before the occurrence of slippage displacement of a contact member, on the basis of a change in resistivity of a pressure-sensitive conductive sheet that is caused by a change in the dispersion arrangement state of conductive particles in a flexible layer main body right before the contact member starts slipping and becoming displaced with respect to a contact receiving member, at a time when the contact member slips and becomes displaced with respect to the contact receiving member after the contact member is pushed against a slippage detection member that has the pressure-sensitive conductive sheet, which is made by dispersing the conductive particles in the flexible layer main body and which is disposed on the contact receiving member, with a resistivity value of the pressure-sensitive conductive sheet determined by the state of contact of the dispersed conductive particles at a time when a tangential-direction force is applied to a surface of the flexible layer main body after a normal-direction force is applied thereto; and
a step of transmitting from a slippage detection calculation section a slippage confirmation signal indicating the occurrence of initial slippage right before the occurrence of the slippage displacement from the occurrence of the high-frequency oscillation waveform component and the magnitude thereof exceeding a predetermined threshold value.

* * * * *